(12) United States Patent
Nishimoto et al.

(10) Patent No.: US 6,593,712 B2
(45) Date of Patent: Jul. 15, 2003

(54) DRIVE CONTROL DEVICE OF VIBRATION WAVE MOTOR

(75) Inventors: Yoshifumi Nishimoto, Tokyo (JP); Eiichi Yanagi, Tokyo (JP); Makoto Shiomi, Yokohama (JP)

(73) Assignees: Canon Kabushiki Kaisha, Tokyo (JP); Canon Seiki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/845,294

(22) Filed: May 1, 2001

(65) Prior Publication Data

US 2002/0005678 A1 Jan. 17, 2002

(30) Foreign Application Priority Data

May 8, 2000 (JP) ......................................... 2000-134503

(51) Int. Cl.[7] .......................... H02K 33/00; H02N 2/00
(52) U.S. Cl. ...................... 318/114; 318/116; 318/129
(58) Field of Search ................. 318/114–119, 122–130, 318/134; 310/314, 316, 317, 318

(56) References Cited

U.S. PATENT DOCUMENTS

| 1,573,003 A | * | 2/1926 | Japolsky et al. | |
| 2,310,185 A | * | 2/1943 | Weyandt | |
| 4,232,661 A | * | 11/1980 | Christensen | 318/114 X |
| 4,564,267 A | | 1/1986 | Nishimoto | 350/379 |
| 4,973,876 A | * | 11/1990 | Roberts | 310/316 |
| 5,625,263 A | | 4/1997 | Suganuma | 318/116 |
| 6,163,100 A | * | 12/2000 | Morizaki et al. | 310/317 |

* cited by examiner

Primary Examiner—Bentsu Ro
(74) Attorney, Agent, or Firm—Fitzpatrick, Cella, Harper & Scinto

(57) ABSTRACT

The present invention relates to a vibration wave motor which is configured to prevent abnormal noise from being produced at a start time or a stop time and, more particularly, to a control device for a vibration wave motor which obtains a driving force by applying a periodic voltage to an electromechanical energy conversion element so as to generate in a vibration member thereof a plurality of standing waves having a phase difference therebetween, the plurality of standing waves being synthesized to generate a driving vibration in the vibration member. The control device comprises a frequency control circuit which varies a frequency of the periodic voltage and, when a driving force of the vibration wave motor is to be stopped, varies the periodic voltage so as to achieve a predetermined frequency at which a rotational speed of the vibration wave motor becomes zero, and a voltage control circuit which gradually lowers a voltage level of the periodic voltage to a predetermined voltage and then, after the frequency control circuit varies the frequency so as to achieve the predetermined frequency, stops energization of the vibration wave motor.

4 Claims, 2 Drawing Sheets

DRIVE CONTROL DEVICE OF VIBRATION WAVE MOTOR

BACKGROUND OF THE INVENTION

1. Field of the Invention

The present invention relates to a drive control device of vibration wave motor which is configured to obtain a driving force by applying a periodic signal to an electro-mechanical energy conversion element to vibrate a vibration member.

2. Related Background Art

A vibration wave motor is generally composed of a vibration member, which consists of an electro mechanical energy conversion element and an elastic member, and a moving member which is kept in press contact with the vibration member; a driving force is generated in the vibration member by applying a periodic signal (an AC signal) to the electro-mechanical conversion element so as to vibrate the vibration member, thereby to apply a frictional driving force to the moving member so as to obtain movement, such as rotational movement. In the vibration wave motor, a plurality of periodic signals having different phases are applied to the electro-mechanical energy conversion element, thereby forming in the vibration member a plurality of standing waves having different phases, respectively; the plurality of standing waves are synthesized to compose a driving vibration in the vibration member.

As a control device for controlling rotational drive of such a vibration wave motor, there is conventionally known a control device disclosed, for example, by Japanese Patent Application Laid-Open No. 3-18282. The vibration wave motor has a property of changing its rotational speed according to a frequency of the periodic signal applied to the electro-mechanical energy conversion element, and when the vibration wave motor is to be started smoothly, the above described control device first sets a frequency of a periodic signal at a frequency at which the rotational speed of the vibration wave motor is zero, applies a periodic signal having a specified voltage to the electro-mechanical energy conversion element and then gradually changes the frequency of the periodic signal to a frequency corresponding to a desired rotational speed of the vibration wave motor. When the vibration wave motor is to be stopped smoothly, in contrast, the control device first changes the frequency of the periodic signal to the frequency at which the rotational speed of the vibration wave motor is zero and zeroes the specified voltage of the periodic signal. Furthermore, when the vibration wave motor is to be stopped abruptly for positioning, the control device zeroes the specified voltage of the periodic signal without changing the frequency.

Even when the periodic signal has the specified frequency at which the rotational speed of the vibration wave motor is zero, however, the vibration member is generally vibrating while the periodic signal has the specified voltage, whereby a vibration wave motor which is controlled with the above described conventional control device poses a problem that a vibration amplitude of the vibration member changes abruptly and an abnormal noise is produced due to an impact of the abrupt change of the vibration amplitude of the vibration member when a voltage value of the periodic signal is changed from zero to the specified voltage value at a start time and a voltage value of the periodic signal changes from the specified voltage value to zero at a stop time.

SUMMARY OF THE INVENTION

The present invention has been derived in view of such a problem, and an object of the present invention is to provide a drive control device of a vibration wave motor which prevents abnormal noise from being produced at a start time and a stop time.

In order to attain the above described object, one aspect of the application is to provide a device which applies, for driving the motor, a voltage lower than a specified voltage value and gradually changes the applying voltage from this condition to the specified voltage value at a vibration wave motor start time.

For the above described object, one aspect of the application is to provide a device which gradually changes the specified voltage value to a voltage value lower than the specified voltage and stops applying the voltage from this condition at a vibration wave motor stop time.

Other objects of the present invention will be apparent from embodiments which are described below with reference to the accompanying drawings.

DESCRIPTION OF THE EMBODIMENT OF THE INVENTION

Now, embodiments of the present invention will be described with reference to the accompanying drawings.

Figure 1:
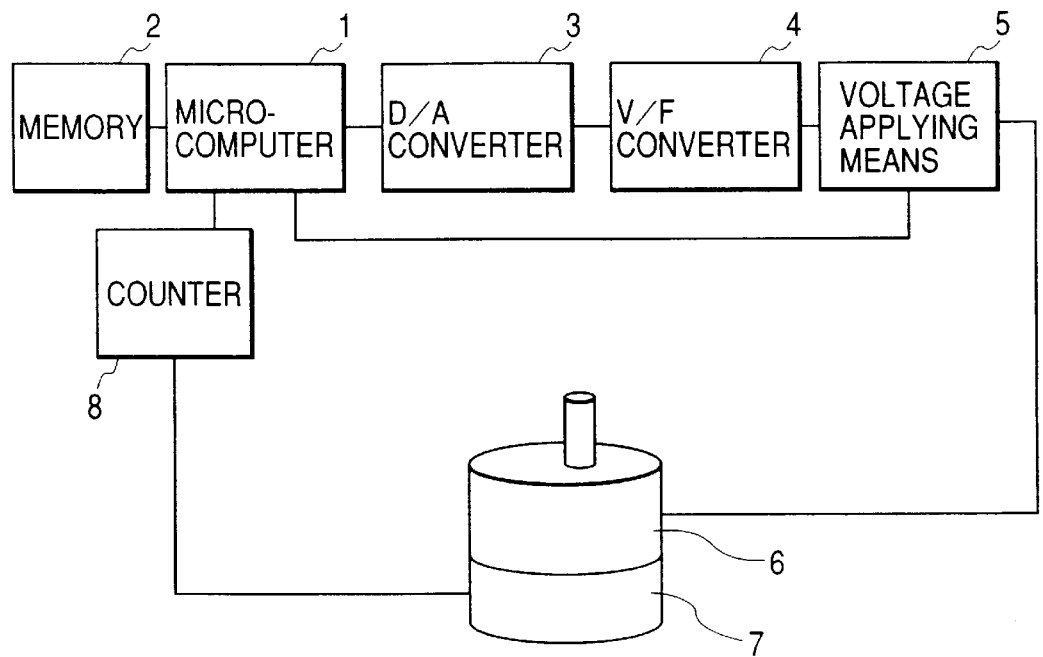
FIG. 1 is a block diagram showing a drive control device of a vibration wave motor according to an embodiment of the present invention.

FIG. 1 is a block diagram showing a configuration of a drive control device of a vibration wave motor according to an embodiment of the present invention.

Reference numeral 1 denotes a microcomputer, reference numeral 2 denotes a memory connected to the microcomputer 1, reference numeral 3 denotes a D/A converter which converts a digital command value from the microcomputer 1 into an analog voltage and reference numeral 4 denotes a V/F converter which outputs a periodic signal having a frequency corresponding to an output voltage value from the D/A converter 3. Reference numeral 5 denotes voltage applying means which shapes a waveform of the periodic signal output from the V/F converter 4 so as to drive a vibration wave motor 6 and outputs the periodic signal to the vibration wave motor 6. A voltage value of the periodic signal output from the voltage applying means 5 is changed according to a command from the microcomputer 1.

Reference numeral 7 denotes a rotary encoder for detecting rotational angle coordinates of the vibration wave motor 6, and a pulse signal is input into a counter 8 from the rotary encoder 7 as the vibration wave motor 6 rotates. The counter 8 counts the number of accumulated pulse signals on the basis of the input pulse signal and inputs the number into the microcomputer 1 as position information.

Though FIG. 1 shows an example where the vibration wave motor 6 and the rotary encoder 7 are coupled directly with each other, a transmission mechanism such as a gear, a belt or the like may be interposed.

Figure 2:
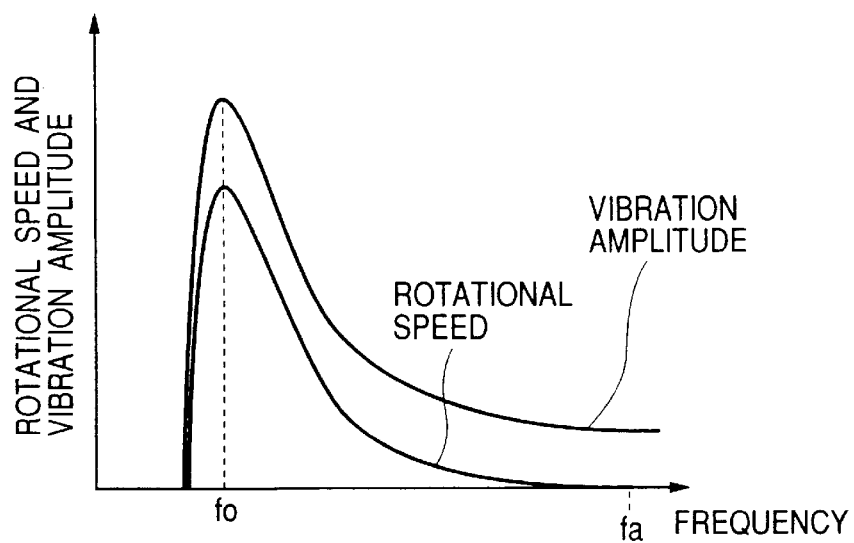
FIG. 2 is a graph showing a relation of a vibration amplitude of a vibration member in a vibration wave motor and a rotational speed of the vibration wave motor relative to a frequency of a periodic signal input into the vibration wave motor.

FIG. 2 is a graph showing a relation of a vibration amplitude of a vibration member in the vibration wave motor 6 and a rotational speed of the vibration wave motor 6 relative to a frequency of the periodic signal input into the vibration wave motor 6.

As seen from FIG. 2, the vibration wave motor generally has a property that the vibration amplitude of the vibration member and the rotational speed of the vibration wave motor change dependently on the frequency of the periodic signal, and in a frequency region higher than a resonance frequency $f_o$, the vibration amplitude of the vibration member and the rotational speed of the vibration wave motor are gradually lowered as the frequency is increased. The rotational speed of the vibration wave motor becomes zero at a predetermined frequency $f_a$. The vibration amplitude of the vibration member is not zeroed even at the predetermined frequency $f_a$.

When it is desired to start the vibration wave motor 6 smoothly, it is conventional to set the periodic signal at a frequency which is selected as an initial frequency usually equal to the predetermined frequency fa or higher than the predetermined frequency fa and give a periodic signal having a specified voltage value to the vibration wave motor 6. Then, the frequency of the periodic signal is gradually scanned toward a lower frequency, thereby bringing the frequency of the periodic signal close to a frequency corresponding to a desired rotational speed.

When it is desired to stop the vibration wave motor 6 smoothly, on the other hand, the frequency of the periodic signal having the specified voltage value is scanned toward a higher frequency, thereby bringing the frequency of the periodic signal to the frequency which is usually equal to the predetermined frequency fa or higher than the predetermined frequency fa. Then, the specified voltage value of the periodic signal is zeroed when the vibration wave motor stops rotating. Furthermore, when the vibration wave motor is to be positioned, a rotation of the vibration wave motor 6 is stopped by zeroing the specified voltage value of the periodic signal without scanning the frequency.

Abnormal noise is conventionally produced when the vibration wave motor is started and stopped as described above. This phenomenon results from the fact that a vibration amplitude value of the vibration member is not zero even in a region where the frequency of the periodic signal corresponds to a rotational speed of zero, as shown in FIG. 2. That is, a so called step input is given to the vibration wave motor 6 and an ultrasonic vibration is generated with a remarkably short time constant when application of the periodic signal to the vibration wave motor 6 is started at a start time (that is, a voltage value of the periodic signal is changed from zero to the specified value). Accordingly, an impact force is given to a rotor (moving member), thereby causing a mechanical vibration within an audible region which is heard by human ears as abnormal noise.

Also, at a motor stop time a vibration amplitude of the vibration member is zeroed in a remarkably short time and an impact force is given to the rotor (moving member), whereby an abnormal noise is heard by human ears when the application of the periodic signal to the vibration wave motor 6 is stopped (the voltage value of the periodic signal is changed from the specified value to zero).

In order to moderate the above described impact force, the drive control device according to the present invention is configured so that the microcomputer 1 emits a command to the voltage applying means 5 so that, at a motor start time, application of the periodic signal is started at a voltage value of the periodic signal which is set at a value $V_a$ lower than a specified value $V_o$, and then the voltage value is gradually enhanced to the specified value $V_o$. Experiments which were effected using this method succeeded in remarkably lowering the abnormal noise.

Also, at a motor stop time the voltage value of the periodic signal is gradually lowered from the specified value $V_o$ to a low voltage $V_b$, and then the application of the periodic signal is stopped. Experiments which were effected using this method exhibited a remarkable effect for lowering the abnormal noise.

Furthermore, measurements of a relation of the above described voltage values $V_a$ and $V_b$ relative to the abnormal noise indicated that the abnormal noise could not be heard by human ears so long as the voltage values $V_a$ and $V_b$ were not higher than 30% of the specified voltage Vo, both at the start time and the stop time.

The embodiment is therefore configured to start the application of the periodic signal in a condition where the voltage value of the periodic signal is set at a value of 30% of the specified voltage Vo and then gradually enhance the voltage value of the periodic signal to the specified voltage Vo at the start time. Furthermore, the voltage value of the periodic signal is gradually lowered from the specified voltage Vo and the application of the periodic signal is stopped after the voltage value of the periodic signal reaches 30% of the specified voltage Vo at the stop time.

From the viewpoints of prevention of the abnormal noise and rotation control performance, it is further preferable that a time to be required for changing the voltage value of the periodic signal from Va to Vo at the motor start time or a time to be required for changing the voltage value of the periodic signal from Vo to Vb at the motor stop time is set not shorter than 0.001 second and not longer than 0.008 second.

Figure 3A:
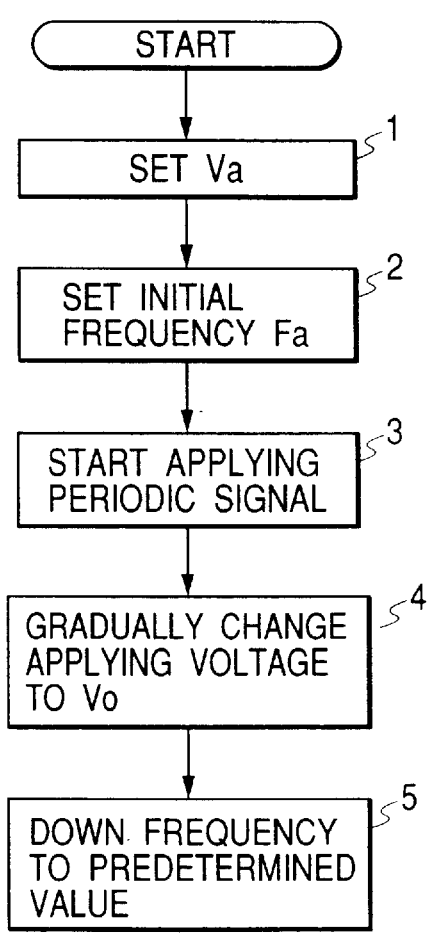
FIG. 3A and FIG. 3B are control flow charts descriptive of operations of the drive control device of the vibration wave motor.

FIG. 3A shows a flow of processings performed by the computer 1 at the start time.

At start time, the computer 1 sets the above described voltage applying means so that it outputs the voltage $V_a$ at step 1 and sets an initial frequency $f_a$ at step Z. The set voltage $V_a$ which has the set frequency $f_a$ is applied from the voltage applying means 5 to the motor 6 at step 3, the voltage is gradually changed to the above described $V_o$ at step 4 and a frequency f is changed toward a lower frequency at step 5 after the voltage reaches $V_o$.

Figure 3B:
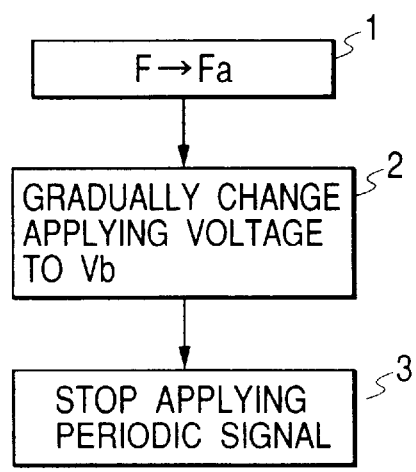

FIG. 3B shows a flow of processions performed by the computer 1 at stop time.

At the stop time, the frequency is changed to fa at step 1, the voltage is gradually changed from Vo to the above described Vb at step 2 and application of the periodic signal is stopped at step 3 after the voltage reaches Vb.

In addition, it is needless to say that the drive control device of a vibration wave motor according to the above described embodiment may be composed of hardware or software, and when a function of the drive control device of the vibration wave motor is to be realized by software, the present invention also may be accomplished by providing a memory medium which stores program codes for the software realizing a function of the above described embodiment for a system or a device so that a computer (or a CPU or an MPU) of the system or the device reads out and executes the program codes stored in the memory medium.

What is claimed is:

1. A control device for a vibration wave motor which obtains a driving force by applying a periodic voltage to an electro-mechanical energy conversion element so as to generate in a vibration member thereof a plurality of standing waves having a phase difference therebetween, the plurality of standing waves being synthesized to generate a driving vibration in the vibration member, the control device comprising:

a frequency control circuit which varies a frequency of the periodic voltage and, when a driving force of the vibration wave motor is to be stopped, varies the periodic voltage so as to achieve a predetermined frequency at which a rotational speed of the vibration wave motor becomes zero; and a voltage control circuit which gradually lowers a voltage level of the periodic voltage to a predetermined voltage and then, after the frequency control circuit varies the frequency so as to achieve the predetermined frequency, stops energization of the vibration wave motor.

2. The control device according to claim 1, wherein the predetermined voltage has a value which is not higher than 30% of a voltage so far applied.

3. The control device according to claim 1, wherein a time required for varying the voltage level so as to achieve the predetermined voltage is not less than 0.001 seconds.

4. The control device according to claim 3, wherein the time required for varying the voltage level so as to achieve the predetermined voltage is not more than 0.008 seconds.

* * * * *

UNITED STATES PATENT AND TRADEMARK OFFICE
CERTIFICATE OF CORRECTION

PATENT NO. : 6,593,712 B2
DATED : July 15, 2003
INVENTOR(S) : Yoshifumi Nishimoto et al.

It is certified that error appears in the above-identified patent and that said Letters Patent is hereby corrected as shown below:

<u>Title page,</u>
Item [56], References Cited, insert:

-- FOREIGN PATENT DOCUMENTS
   JP     3-18282          01/1991 --.

<u>Column 3,</u>
Lines 23, 24 and 35, "Fa" should read -- $F_a$ --.
Line 36, "Fa." should read -- $F_a.$ --.

<u>Column 4,</u>
Line 18, "Vo," should read -- $V_o,$ --.
Lines 23, 25, 27 and 29, "Vo" should read -- $V_o$ --.
Line 33, "Va" should read -- $V_a$ --, and "Vo" should read -- $V_o$ --.
Line 35, "Vo" should read -- $V_o$ --, and "Vb" should read -- $V_b$ --.
Line 50, "Vo" should read -- $V_o$ --.
Line 51, "Vb" should read -- $V_b$ --.
Line 52, "Vb." should read -- $V_b.$ --.

Signed and Sealed this

Fourth Day of May, 2004

JON W. DUDAS
*Acting Director of the United States Patent and Trademark Office*